(12) United States Patent
Charrier et al.

(10) Patent No.: US 7,377,749 B2
(45) Date of Patent: May 27, 2008

(54) DEVICE FOR BALANCING A ROTATING PART, IN PARTICULAR A TURBOJET ROTOR

(75) Inventors: Emmanuel Charrier, Blandy les Tours (FR); Philippe Pabion, Vaux le Penil (FR); Jean-Luc Soupizon, Vaux le Penil (FR)

(73) Assignee: Snecma, Paris (FR)

( * ) Notice: Subject to any disclaimer, the term of this patent is extended or adjusted under 35 U.S.C. 154(b) by 481 days.

(21) Appl. No.: 11/084,151

(22) Filed: Mar. 21, 2005

(65) Prior Publication Data

US 2005/0226728 A1    Oct. 13, 2005

(30) Foreign Application Priority Data

Apr. 9, 2004    (FR) .................................. 04 03736

(51) Int. Cl.
*F01D 25/00*    (2006.01)
(52) U.S. Cl. ...................... 416/119; 416/144; 416/145; 416/220 R
(58) Field of Classification Search ................ 416/119, 416/144, 145, 220 R
See application file for complete search history.

(56) References Cited

U.S. PATENT DOCUMENTS 3,656,865 A    4/1972    Spears, Jr.
4,220,055 A *  9/1980    Dubois et al. .............. 464/180
4,784,012 A * 11/1988    Marra ......................... 416/144
4,803,893 A    2/1989    Bachinski
4,879,792 A   11/1989    O'Connor
5,011,374 A *  4/1991    Miller ......................... 416/144
5,018,943 A *  5/1991    Corsmeier et al. .......... 416/144
5,582,077 A * 12/1996    Agram et al. ............... 416/144

FOREIGN PATENT DOCUMENTS

EP    0 169 799    1/1986
FR    2 641 031    6/1990

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A device for balancing a rotating part, in particular a turbine rotor in a turbomachine such as a turbojet or the like, the device comprising at least one balance weight comprising engagement means for engaging it on an annular flange of the part, and locking means associated with the balance weight and with the annular flange to prevent the balance weight from moving relative to the annular flange and to block itself against moving both in rotation and in axial translation relative to the balance weight.

18 Claims, 3 Drawing Sheets

Fig. 1

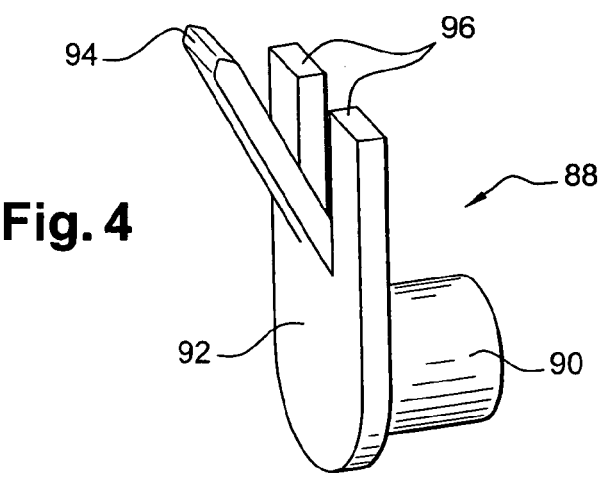
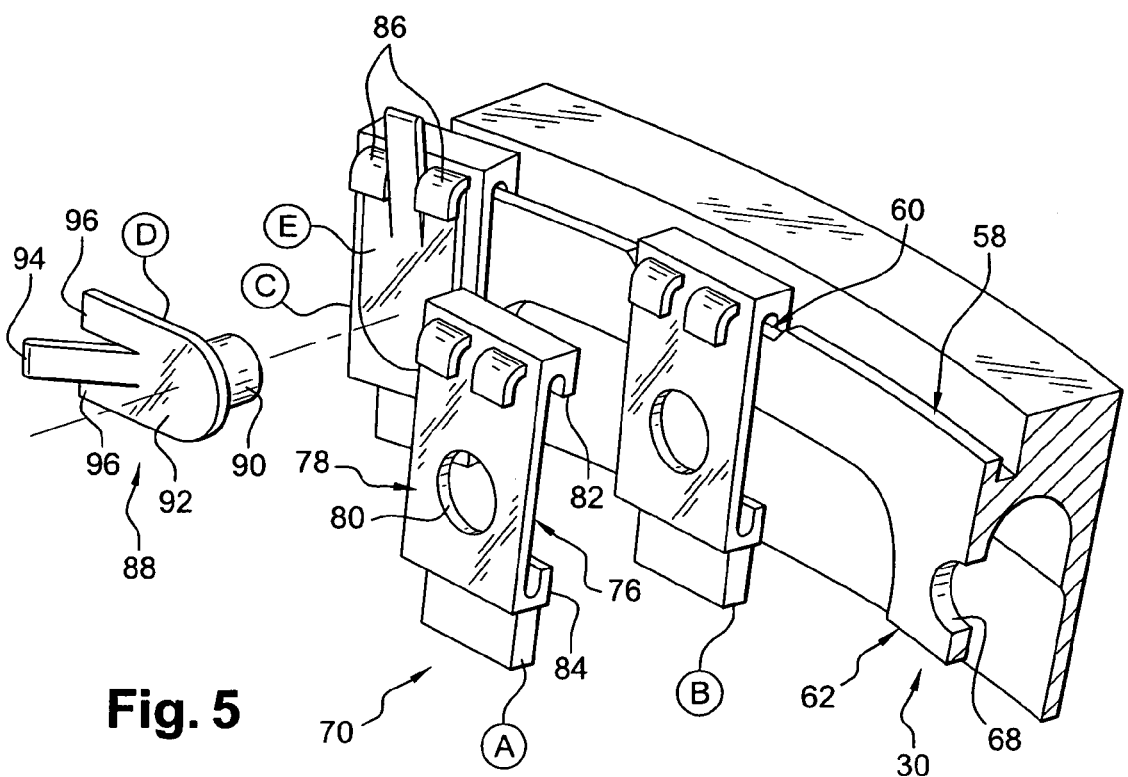

DEVICE FOR BALANCING A ROTATING PART, IN PARTICULAR A TURBOJET ROTOR

The present invention relates to a device for balancing a rotating part, in particular a turbine rotor in a turbomachine such as a turbojet, or the like.

BACKGROUND OF THE INVENTION

It is well known in the art to correct the unbalance of a rotating part by means of a balance weight which is secured to the part by any appropriate means.

In a low-pressure turbine of a turbojet, constituted by rotary disks carrying blades and secured to one another by annular flanges, balance weights are secured to an upstream annular flange of the upstream disk and/or to a downstream annular flange of the downstream disk, by means of bolts.

That fastening technique requires there to be sufficient empty space between the upstream annular flange and the upstream disk in order to pass a tool for tightening nuts onto the bolts. That leads to extra size in the axial direction upstream from the turbine that cannot be reduced, and that makes it difficult to put a distributor nozzle into place.

OBJECTS AND SUMMARY OF THE INVENTION

A particular object of the invention is to avoid those drawbacks while reducing the weight of the means for fastening the balance weights to the rotary disks of such a turbine or such a turbomachine.

To this end, the invention provides a device for balancing a rotating part, in particular a turbine rotor in a turbomachine such as a turbojet or the like, the device comprising at least one balance weight mounted on an annular flange of the part, and fastener means for fastening the balance weight on said annular flange, wherein the balance weight has engagement means for engaging on said annular flange of the part, and wherein locking means are associated with the balance weight and with the annular flange to prevent the balance weight from moving relative to the annular flange and to block itself against movement both in rotation and in axial translation relative to the balance weight.

The device of the invention makes it possible:

to avoid using the nut-tightening tools of the prior art;

consequently to reduce axial size, which in a turbine facilitates integrating the distributor nozzle upstream from the upstream disk of the turbine; and to reduce the weight of the device for balancing a rotor, typically by 1.4 kilograms (kg) for a turbojet manufactured by the Applicant.

According to a characteristic of the invention, the balance weight has, on its face facing towards the annular flange, at least one L-shaped hook for engaging on an annular rim of said annular flange.

This hook constitutes the above-specified engagement means and also constitutes means for holding the balance weight axially to the flange of the part.

Preferably, at its radially inner and outer ends, the balance weight has facing L-shaped hooks for engaging on two concentric annular rims of said annular flange.

This configuration improves axial retention of the balance weight on the annular flange.

Advantageously, at least one of the annular rims includes an interruption or notch enabling the balance weight to be put into place and engaged on the annular flange by movement in axial translation.

This makes it easier to put the balance weight into place on the part.

According another characteristic of the invention, the locking means are fitted onto the balance weight and comprise a cylindrical peg for engaging axially in an orifice in the balance weight and in a corresponding orifice in the annular flange, together with means for preventing it from moving both axially and in rotation relative to the balance weight.

In an embodiment of the invention, the means for preventing it from moving in rotation comprise a deformable tongue for being engaged by being moved in a direction parallel to the axis of rotation of the part into a position between two adjacent abutments formed on the balance weight.

The deformation of the tongue and its engagement between the abutments of the balance weight serve in simple manner to prevent the locking means from moving in rotation on the balance weight.

The locking means include a transverse flat head formed at one end of the peg and designed to bear against the balance weight and to become engaged by turning about the axis of the peg under a rim of the balance weight.

In simple manner, the above-mentioned tongue is formed by being cut out from the flat head of the cylindrical peg.

The balance weight is thus locked on the annular flange by turning the cylindrical peg about its own axis, into a blocking position in which the head of the peg is inserted under the rim of the balance weight, the tongue then being engaged between the two adjacent abutments of the balance weight.

Preferably, the length of the tongue is sufficient to cause it to project beyond the abutments of the balance weight when it is in the blocking position, thereby making it easier to dismantle the locking means by returning the tongue to its initial position.

According to another characteristic of the invention, the peg of the locking means is mounted as a tight fit in the orifice of the above-mentioned annular flange and with clearance in the orifice in the balance weight.

This makes it possible to avoid clearance between the cylindrical peg and the annular flange, which could lead to vibration and premature wear of the annular flange and of the locking means.

In a particular embodiment of the invention, the annular flange has a predetermined number of orifices for mounting a balance weight, said number being equal to 24, for example, said orifices being regularly distributed around the annular flange.

This makes it possible to mount the balance weight in a selected one out of 24 possible positions on the annular flange in order to compensate the unbalance of the part.

BRIEF DESCRIPTION OF THE DRAWINGS

Other details, characteristics, and advantages of the invention appear on reading the following description made by way of non-limiting example with reference to the accompanying drawings, in which:

FIG. 4 is a diagrammatic perspective view of means for locking the balance weight in accordance with the invention; and FIG. 5 is a diagrammatic fragmentary perspective view showing different stages in positioning, engaging, and locking the balance weight of the invention.

MORE DETAILED DESCRIPTION

Figure 1:
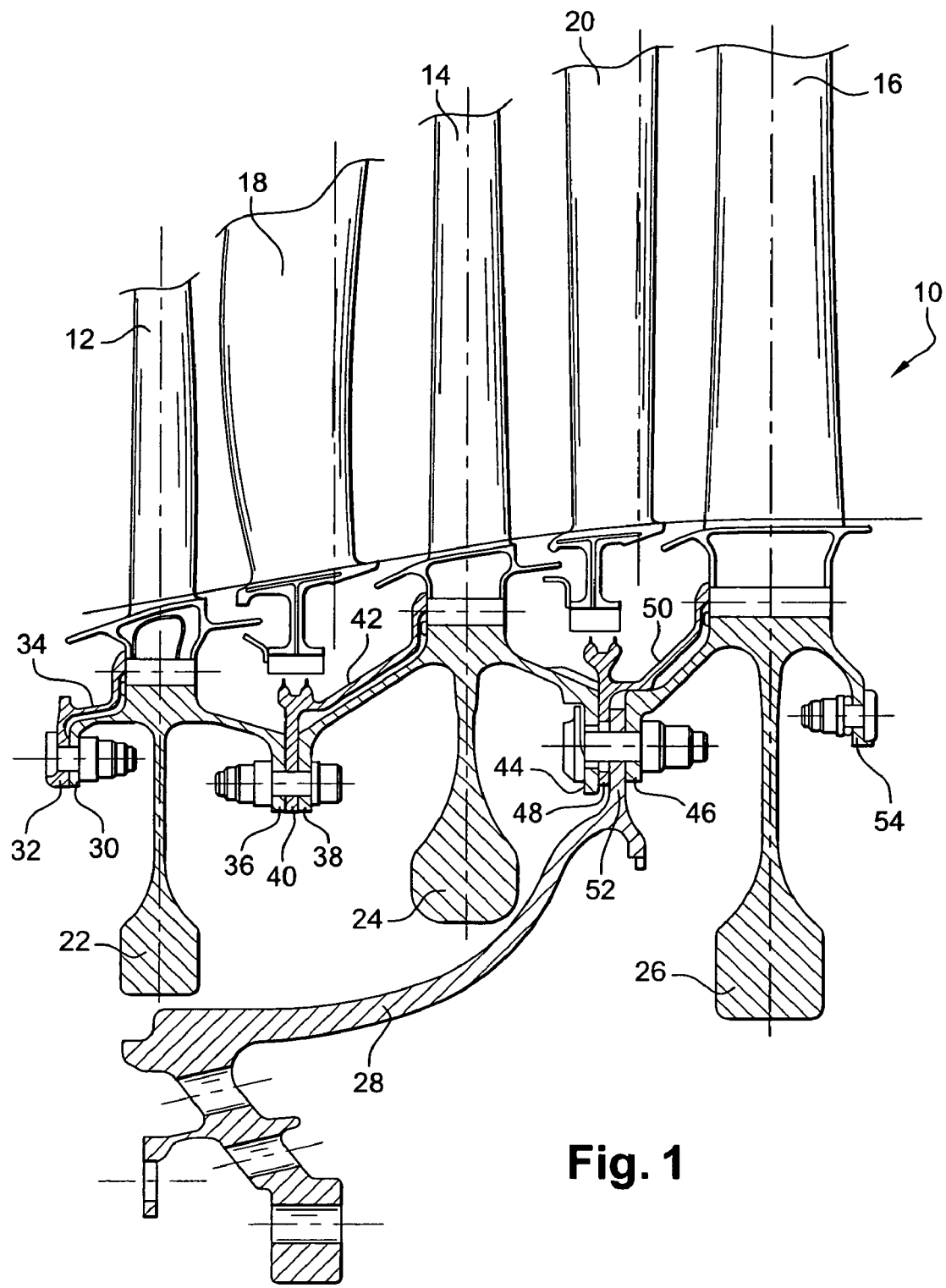
FIG. 1 is a diagrammatic fragmentary axial section view of a low-pressure turbine of a turbojet.

FIG. 1 is a fragmentary view of a low-pressure turbine 10 of a turbojet, having three rotor blades stages 12, 14, and 16, and two stator blade stages 18 and 20.

Using means that are not shown, the stator blades 18 and 20 are mounted via their radially outer ends to a casing of the turbojet, and the radially inner ends of the rotor blades 12, 14, and 16 are mounted on three rotor disks 22, 24, and 26 by suitable means, e.g. of dovetail or analogous type.

Each disk 22, 24, and 26 has an upstream annular flange and a downstream annular flange, these flanges serving to fasten the disks to one another and to a drive cone 28 connected to the shaft of the turbojet, and also to fasten annuluses for retaining the blade routes in the disks.

More precisely, the upstream disk 22 has an upstream annular flange 30 having bolted thereon an annular flange 32 of an annulus 34 for retaining the roots of the blade 12 on the upstream disk 22, and at least one balance weight, and a downstream annular flange 36 bolted to an upstream annular flange 38 of the intermediate disk 24 and to an annular flange 40 of an annulus 42 for retaining the roots of the blades 14 on the intermediate disk 24.

The intermediate disk 24 has a downstream annular flange 44 bolted to an upstream annular flange 46 of the downstream disk 26 and also to an annular flange 48 of an annulus 50 for retaining the roots of the blades 16 in the downstream disk 26 and to an annular flange 52 of the drive cone 28.

The downstream disk 26 has a downstream annular flange 54 which can have at least one balance weight bolted thereto.

Because the balance weights are fastened by tightening nuts, which requires the use of a nut-holding tool, they are fitted to the upstream annular flange 30 of the upstream disk 22 and the downstream annular flange 54 of the downstream disk 26, with the spaces between the flange 30 and the disk 22, and the disk 26 and the flange 54 leaving room to insert a nut-holding tool.

This occupies a relatively large amount of space axially at the upstream end of the turbine, which is awkward in particular when integrating the distributor nozzle (not shown) upstream from the disk 22.

The invention solves this problem by means of a device that enables a balance weight to be mounted on an annular flange of a rotor disk, such as the annular upstream flange 30 of the upstream disk 22, without using a nut and a bolt, with this being done by engaging the balance weight on said annular flange and then by locking the balance weight to said flange by means of a single part.

Figure 2:
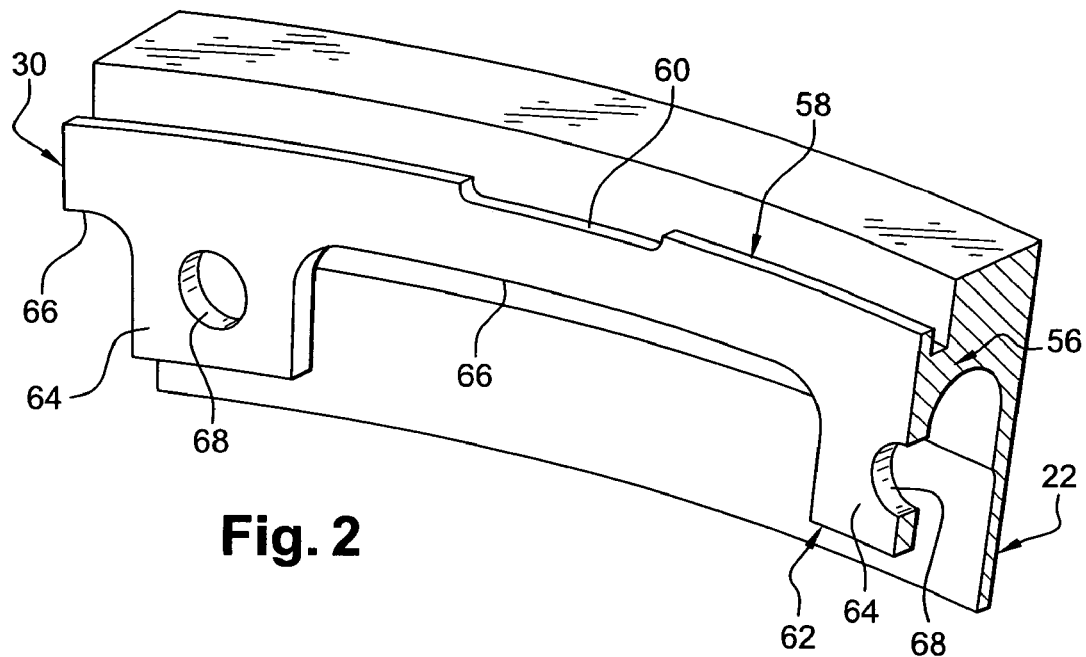
FIG. 2 is a diagrammatic fragmentary perspective view of an annular flange of a rotor disk in a low-pressure turbine in accordance with the invention.

In the invention, the annular flange 30, shown in part in FIG. 2, is connected to the upstream disk 22 (also shown in part) by means of a cylindrical annular bridge 56 of short axial extent.

The annular flange 30 has two concentric peripheral edges 58 and 62. The edge 58 that is radially further out than the bridge 56 includes an interruption or notch 60 enabling the balance weight to be put into place and engaged, as described in greater detail with reference to FIG. 5, and the peripheral edge 62 that is radially further in than the bridge 56, is "festooned" or crenellated, i.e. it presents solid portions 64 alternating with gap portions 66 that are regularly distributed around the annular flange 30, the solid portions 64 including cylindrical orifices 68 for passing locking means for locking balance weights, these orifices being 24 in number, for example, and distributed around one complete turn of the flange 30.

Figure 3:
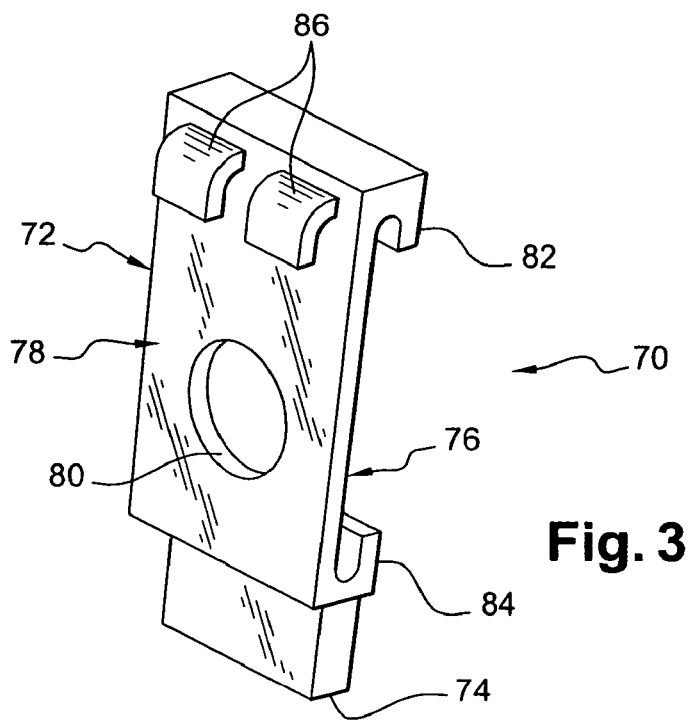
FIG. 3 is a diagrammatic perspective view of a balance weight in accordance with the invention.

The balance weight 70 shown in FIG. 3 comprises a flat rectangular plate 72 and a rectangular appendix 74 connected to the bottom edge of the plate 72, said appendix 74 being interchangeable and/or workable in order to adapt the balance weight 70 to the amount of unbalance that is to be compensated. Typically, this weight lies in the range 1 gram (g) to 10 g.

The plate 72 of the balance weight 70 has two major faces 76 and 78 and a cylindrical orifice 80 for passing the balance weight locking means, this orifice being formed substantially in the middle of the plate 72.

The face 76 of the plate 72 that is to press against the annular flange carries an L-shaped hook 82 formed at its top end over its entire width and facing its bottom end, and another L-shaped hook 84 formed at its bottom end, extending over its entire width, and facing towards its top end.

The face 78 of the plate 72 for receiving the locking means carries two parallel and adjacent L-shaped hooks 86 formed at its top end and facing towards its bottom end.

The locking means, shown in FIG. 4, comprise a single part 88 having a cylindrical peg 90 for engaging in the through orifices 80 and 68 in the balance weight 70 and in the annular flange 30, respectively, and a flat transverse head 92 at one end of the cylindrical peg 90 for coming to bear against the face 78 of the plate 72 of the balance weight 70.

The flat head 92 of the locking means 88 has a transverse tab in which a tongue 94 is cut out and folded at an angle of about 30° away from the cylindrical peg 90. The remaining portion 96 of the tab that is not folded out is for engaging under one of the above-mentioned L-shaped hooks 86 on the face 78 of the balance weight 70. In FIG. 4, there is shown an embodiment in which a tongue 94 is formed by being cut out between two portions 96 for engaging beneath the above-mentioned hooks 86.

FIG. 5 is a diagram showing the various stages in mounting a balance weight 70 on an annular flange 30.

In this figure, the balance weight 70 is shown in three different positions: a first position A in which the weight is presented to an interruption or notch 60 in the annular flange 30, then a second position B where it is engaged on the flange until its face 76 is in contact with the flange 30, and a third position C where it is moved in circumferential translation about the axis of the rotor of the turbine until the peripheral edges 58 and 62 of the annular flange 30 are engaged in the L-shaped hooks 82 and 84 of the balance weight 70, and the orifice 80 in the balance weight 70 is in axial alignment with an orifice 68 in the flange 30, corresponding to the point where the balance weight is to be fastened in order to compensate the unbalance.

The balance weight 70 is locked to the annular flange 30 by means of the single part 88 which is shown in two different positions: a position D in which the cylindrical peg 90 is axially in alignment with the orifices 80 and 68 in the balance weight 70 and the annular flange 30, the tongue 94 and the transverse head 92 point tangentially relative to the circumference of the flange 30 so as to enable the transverse head 92 to be pressed against the face 78 of the balance weight 70, and a second position E in the transverse head 92 has been turned about the axis of the peg 90 until its portions 96 has been engaged under the hooks 86 to prevent the part 88 from moving axially relative to the balance weight 70, after which the tongue 94 can be folded down between the above-mentioned hooks 86 to prevent the part 88 from turning about the axis of the peg 90.

In the blocking position, the tongue 94 projects beyond the hooks 86 of the balance weight 70, thus making it easier to remove the locking means 88 by returning the tongue 94 to the inclined position.

The tongue 94 is moved between its two positions by plastic deformation. In position E, the centrifugal axes acting on the tongue when the turbine is in operation tends to keep the tongue in the locking position.

Furthermore, during operation of the turbine, the balance weight is subjected to said centrifugal forces urging it radially outwards. To ensure that the peg 90 of the locking means 88 does not shear, it is mounted as a tight fit in the orifice 68 of the annular flange 30 and with clearance in the orifice 80 of the balance weight 70.

Depending on requirements, one or more balance weights 70 are mounted on the annular flange 30 of the upstream disk 22. It is also possible to mount one or more balance weights in similar manner on the downstream annular flange 54 of the downstream disk 26.

The invention is applicable in general manner to fastening balance weights to any rotary part, and in particular, but not exclusively, to a rotor disk of a low-pressure turbine in a turbojet.

What is claimed is:

1. A device for balancing a rotating part, in a turbomachine, the device comprising at least one balance weight mounted on an annular flange of the part, wherein the balance weight has at least one L-shaped hook engaging on an annular rim of said annular flange and for holding the balance weight axially to the annular flange, and wherein the device further comprises locking means, said locking means cooperating with the balance weight and with the annular flange to prevent the balance weight from moving relative to the annular flange, and further cooperating with the balance weight to block itself against movement both in rotation and in axial translation relative to the balance weight.

2. A device according to claim 1, wherein, at its radially inner and outer ends, the balance weight has facing L-shaped hooks for engaging on two concentric annular rims of said annular flange.

3. A device according to claim 2, wherein at least one of the annular rims includes an interruption or notch enabling the balance weight to be put into place and engaged on the annular flange by movement in axial translation.

4. A device according to claim 1, wherein the locking means are fitted onto the balance weight and comprise a cylindrical peg for engaging axially in an orifice in the balance weight and in a corresponding orifice in the annular flange, together with means for preventing it the locking means from moving both axially and in rotation relative to the balance weight.

5. A device according to claim 4, wherein the means for preventing the locking means from moving in rotation comprise a deformable tongue for being engaged by being moved in a direction parallel to the axis of rotation of the part into a position between two adjacent abutments formed on the balance weight.

6. A device according to claim 5, wherein the locking means include a transverse flat head formed at one end of the peg and designed to bear against the balance weight and to become engaged by turning about the axis of the peg under a rim of the balance weight, in order to form said means for preventing the locking means from moving axially relative to the balance weight.

7. A device according to claim 6, wherein said the above mentioned tongue is formed by being cut out from the flat head of the cylindrical peg.

8. A device according to claim 5, wherein the flat head includes at least one tab adjacent to said tongue for co-operating with an L-shaped hook formed on the balance weight.

9. A device according to claim 8, wherein the balance weight is locked on the annular flange by turning the cylindrical peg about its own axis into a blocking position where the head of the peg is inserted under the rim of the balance weight, with the tongue then being engaged between the two adjacent abutments of the balance weight.

10. A device according to claim 9, wherein the peg of the locking means is mounted as a tight fit in the orifice of said annular flange and with clearance in the orifice in the balance weight.

11. A device according to claim 5, wherein the length of the tongue is sufficient to cause it said tongue to project beyond the abutments of the balance weight when said tongue is in the blocking position, so as to make it easier to dismantle the locking means by returning the tongue to its initial position.

12. A device according to claim 1, wherein the annular flange has a predetermined number of orifices for mounting a balance weight, said orifices being regularly distributed around the annular flange.

13. A device according to claim 1, the device being used for mounting at least one balance weight on an upstream annular flange of an upstream disk of a low-pressure turbine rotor in a turbojet, and/or for mounting at least one balance weight on a downstream annular flange of a downstream disk of said rotor.

14. A rotor disk comprising an annular flange carrying a device according to claim 1.

15. A rotor disk according to claim 14, wherein the annular flange comprises two concentric annular rims, at least one of said concentric annular rims including an interruption or notch enabling the balance weight of the device to be put into place and engaged on the annular flange by movement in axial translation.

16. A turbomachine comprising a device according to claim 1.

17. A device for balancing a rotating part in a turbomachine, the device comprising:
   a balance weight mounted on an annular flange of the rotating part; and
   a lock mechanism that cooperates with the balance weight and with the annular flange to prevent the balance weight from moving relative to the annular flange, and that further cooperates with the balance weight to block itself against movement both in rotation and in axial translation relative to the balance weight,
   wherein, at its radially inner and outer ends, the balance weight has facing L-shaped hooks engaging on two concentric annular rims of said annular flange.

18. A device according to claim 17, wherein at least one of the annular rims includes a notch configured such that the balance weight engages on the annular flange following a movement in axial translation.

* * * * *

UNITED STATES PATENT AND TRADEMARK OFFICE
CERTIFICATE OF CORRECTION

PATENT NO. : 7,377,749 B2
APPLICATION NO. : 11/084151
DATED : May 27, 2008
INVENTOR(S) : Emmanuel Charrier et al.

It is certified that error appears in the above-identified patent and that said Letters Patent is hereby corrected as shown below:

Column 5, line 54, delete "it".

Column 6, lines 4 and 5, delete "the above mentioned";
        line 59, after "hooks" insert --for--.

Signed and Sealed this

Twenty-third Day of December, 2008

JON W. DUDAS
*Director of the United States Patent and Trademark Office*